United States Patent [19]
Zeilstra et al.

[11]  4,293,345
[45]  Oct. 6, 1981

[54] WAX COMPOSITION FOR ENTIRELY OR PARTLY REPLACING CARNAUBA WAX OR MONTAN WAX

[75] Inventors: Jacobus J. Zeilstra, Wijnbergen; Willem J. de Klein, Dieren; Joannes D. Bik, Eerbeek, all of Netherlands

[73] Assignee: Akzona Incorporated, Asheville, N.C.

[21] Appl. No.: 88,646

[22] Filed: Oct. 26, 1979

[30] Foreign Application Priority Data

Oct. 26, 1978 [NL] Netherlands .......................... 7810670

[51] Int. Cl.$^3$ .............................................. C08L 91/06
[52] U.S. Cl. ..................................... 106/270; 260/413; 260/401; 260/410.5; 260/410.9 R
[58] Field of Search ......... 260/413 R, 413 HC, 410.5, 260/410.6, 410.9 R, 401, 404; 106/270

[56] References Cited

U.S. PATENT DOCUMENTS

| | | | |
|---|---|---|---|
| 2,402,137 | 6/1946 | Hanford et al. ............ | 260/29.6 XA |
| 2,823,216 | 2/1958 | Moote, Jr. et al. .................. | 260/413 |
| 3,914,131 | 10/1975 | Hutchison ............................ | 106/268 |
| 3,927,051 | 12/1975 | de Klein .............................. | 260/413 |

FOREIGN PATENT DOCUMENTS 1219332  1/1971  United Kingdom ................ 260/413

*Primary Examiner*—Allan Lieberman
*Assistant Examiner*—Patricia Short
*Attorney, Agent, or Firm*—Francis W. Young; Robert F. Green; Steven M. Odre

[57] ABSTRACT

The present disclosure relates to a wax composition for entirely or partly replacing carnauba wax or montan wax. The composition consists substantially of one or more acids and or derivatives thereof selected from the group consisting of (a) esters of phenols or aromatic, aliphatic or cycloaliphatic alcohols having at least 1 to 10 primary or secondary hydroxyl groups;

(b) amides of ammonia or aliphatic, cycloaliphatic or aromatic amines having at least 1 to 15 primary or secondary amino groups;

(c) salts of alkali metals or alkaline earth metals, amphoteric metals, heavy metals, of ammonium or of a compound containing a tertiary amino group.

The acids are obtained by the free radical addition of 1 mole of acetic anhydride to olefins containing 20 or more carbon atoms in the presence of a trivalent manganese compound.

3 Claims, No Drawings

WAX COMPOSITION FOR ENTIRELY OR PARTLY REPLACING CARNAUBA WAX OR MONTAN WAX

A wax composition for entirely or partly replacing Carnauba wax or Montax wax.

The invention relates to a wax composition for entirely or partly replacing carnauba wax or montan wax and substantially consisting of one or more acids and/or derivatives thereof selected from the group consisting of (a) esters of phenols or aromatic, aliphatic or cycloaliphatic alcohols having at least 1 to 10 primary or secondary hydroxyl groups;

(b) amides of aliphatic, cycloaliphatic or aromatic mono- or diamines having 1 or 2 primary or secondary amino groups;

(c) salts of alkali metals or alkaline earth metals, amphoteric metals, heavy metals, of ammonium or of a compound containing a tertiary amino group.

Substitutes for natural waxes have been proposed before and are described in, inter alia, the German Pat. Nos. 2,432,215 and 2,460,235 and the U.S. Pat. No. 3,914,131. In the process according to the German Pat. No. 2,432,215 these waxes are prepared from high-molecular weight carboxylic acids and high-molecular weight alcohols which are esterified. The carboxylic acids are obtained by oxidation with chromosulphuric acid of an α-olefin fraction having 16 to 17 carbon atoms. The alcohols are obtained by reduction of the resulting carboxylic acids or by oxidative hydrolysis of aluminium trialkyl compounds obtained in the polyethylene synthesis. German Pat. No. 2,460,235 describes the preparation of amide waxes from carboxylic acids and 1, 2 or more isocyanate groups-containing compounds. The carboxylic acids used for their preparation do not contain more than 21 carbon atoms. U.S. Pat. No. 3,914,131 starts from a mixture of substantially α-alkyl(methyl) branched-chain monocarboxylic acids obtained by addition of a monocarboxylic acid having at least 3 carbon atoms in the presence of a peroxide.

A disadvantage of this process consists in that the conversion of the addition reaction is not higher than about 50 to 70%, as a result of which a high percentage of olefin fraction in the end product, which cannot be separated from it on a commercial scale. The product obtained is therefore relatively soft and for its satisfactory performance it must still be mixed with mixed glycerides of saturated mono- and dicarboxylic acids and microcrystalline petroleum wax melting between 80° and 95° C.

Although the substitutes for natural waxes prepared according to the above-discussed patent specifications are suitable for a number of uses, the substitutes known so far are not nearly as generally usable as, for instance, carnauba wax. The present invention provides novel wax compositions which to a great extent do away with the drawbacks to the known substitutes for wax compositions.

The invention consists in that in a wax composition of the known type indicated above at least 40 percent by weight of the acid present as such or at least 40 percent by weight of the acid from which the derivatives are prepared has a branched-chain structure and at least 10 percent by weight thereof corresponds to the formula:

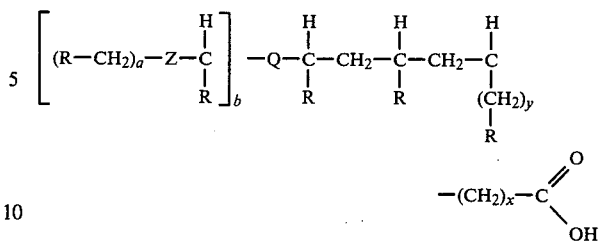

where
$x=0$, if $y=2$
or $x=2$, if $y=0$
$R=CH_3(CH_2)_n$, where n represents an integer from 17 to 42; b is 0 or 1, where, if $b=0$, Q represents a hydrogen atom, and if $b=1$, Q represents a $CH_2$-group, and
$a=0$ or 1, where if $a=0$, Z represents a hydrogen atom, and if $a=1$, Z represents a $CH_2$-group.

It has been found that the wax compositions according to the invention are not detrimentally affected if a portion of the branched-chain acids, or a portion of the branched-chain acids from which the derivatives are prepared, corresponds to the formula:

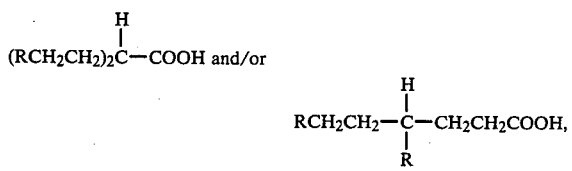

where R has the meaning given in the former formula. Wax compositions having optimum properties for most uses are generally obtained if besides the branched-chain acids or derivatives thereof having the above formulae for these acids there is present an amount of 40 to 60 percent by weight of straight-chain aliphatic monocarboxylic acids or derivatives thereof, with the acid having the formula $RCH_2CH_2CH_2COOH$, where R has the above-mentioned meaning and about 30 to 40 percent by weight of γ-branched carboxylic acids or derivatives thereof, with the acid having the formula

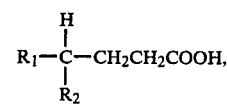

where $R_1$ and $R_2$ represent linear alkyl groups which together have the same number of carbon atoms as the group R. The acids of the first-mentioned formula can be obtained by reacting an α-olefin having 20 to 45 carbon atoms with acetic anhydride at a temperature in the range of 100° to 140° C. in the presence of a catalytic amount of an at least trivalent manganese compound. For the trivalent manganese compound it is preferred to use manganese (III) acetate, the molar ratio of converted olefin to manganic acetate in the reaction mixture being at least 4.

The most favourable results are generally obtained at a reaction temperature in the range of 115° to 125° C. in the presence of manganic acetate as initiator. To prevent oxidation of the substrate the concentration of the manganic acetate is preferably chosen between $10^{-3}$ and $10^{-10}$ moles per liter. Although it is possible in principle to prepare relatively pure products if the starting material is a pure α-olefin, in actual practice use will always be made of mixtures of α-olefins which in the petro-chemical industry are obtained by fractionation. It has been found, however, that in many cases the use of mixtures of α-olefins even leads to wax compositions having improved properties. A starting material particularly suitable for the preparation of the present wax compositions is a commercially available mixture of olefins made up of about 22% by weight of olefins having not more than 28 carbon atoms and about 78% by weight of $C_{30+}$ olefins, about 60 to 70% by weight of the olefins being α-olefins. Under the above-mentioned conditions this olefin mixture is converted into a mixture of straight-chain and branched-chain telomeric monocarboxylic acids. The use of the above-described addition reaction in which acetic anhydride is added to α-olefins results in a product distribution entirely different from the one obtained by the addition reaction described in the above-mentioned U.S. patent specification where propionic acid is added to an α-olefin in the presence of a radical initiator such as a peroxide.

The use of the present process not only results in obtaining linear monocarboxylic acids, but also in obtaining monocarboxylic acids displaying a satisfactory degree of telomerization and, consequently, a relatively very high molecular weight. There is every appearance that the very presence of the latter type of monocarboxylic acids contributes considerably to obtaining the extraordinary favourable properties of the present wax compositions. For a great many applications the use of just a mixture of the above-described monocarboxylic acids will be perfectly suitable. For a number of applications, however, complete or partial derivatization is necessary. The most suitable products or mixtures of products desirable for the most widely varying applications are elaborately described in the literature. In this connection reference is made to "Vom Wachs, Hoechster Beiträge zur Kenntnis der Wachse", published by Farbw. Hoechst, Frankfurt-Hoechst. The ester derivatives to be used in the novel wax compositions according to the present invention are derived from the branched and unbranched acids according to the above formula and phenols or aromatic, aliphatic or cycloaliphatic alcohols having at least 1 to 10 primary or secondary hydroxyl groups.

Suitable phenols that may be used for the preparation of the ester derivatives to be incorporated into the wax compositions according to the invention include phenol, cresol, xylenol, mesitol, durenol, thymol, naphthol, resorcinol, hydroquinone, bisphenols such as 4,4-oxydiphenol, 4,4'-isopropylidene diphenol, 4,4'-methylene diphenol and biphenol-4,4' diol. They may optionally be substituted with, for instance, alkyl or alkoxy groups or halogen. Suitable aromatic hydroxyl compounds include benzyl alcohol, tolyl alcohol (=methylphenyl carbinol), phenethyl alcohol, salicyl alcohol, 2-naphthalene ethanol, phenylpropyl alcohol and cinnamyl alcohol.

Suitable aliphatic or cycloaliphatic alcohols include monohydric alcohols, di- en higher polyhydric alcohols and ether alcohols, which may be mono- or polyfunctional. Optionally, they may contain ethylenically unsaturated groups or other substituents, such as alkyl, alkoxy, halogen or heterocyclic groups such as in furfuryl alcohol. They may contain 1 to 60 or more carbon atoms. Suitable ester derivatives are obtained by making use of methanol, ethanol, n-propanol, isopropanol, n-butanol, t-butanol, iso-amylalcohol, n-hexanol, cyclohexanol, 2-cyclohexene-1-ol, 2-ethylhexanol, n-octanol, isodecanol, capryl alcohol, lauryl alcohol, myristyl alcohol, cetyl alcohol, stearyl alcohol and oxo alcohols such as tridecyl alcohol, which substantially consists of tetramethyl-1-nonanol and hexadecyl alcohol, which consists of a composite mixture of primary alcohols and may be characterized as 2,2-dialkyl ethanols in which the alkyl groups substantially consist of methyl-branched-chain $C_6$ and $C_8$ radicals.

As examples of suitable aliphatic polyols for the preparation of the ester derivatives may be mentioned ethylene glycol, 1,2-propylene glycol, 1,3-propylene glycol, 1,2-butanediol, 1,3-butanediol, 1,4-butanediol, 1,5-pentanediol, 3-methyl-1,5-pentanediol, 2,3-dimethyl-2,3-butanediol, trimethyllol propane, mannitol, sorbitol, glycerol and pentaerythritol. For the preparation of ester derivatives also use may be made of ether alcohols that are suitable to be incorporated into the wax compositions according to the invention. The ether alcohols may be monofunctional or polyfunctional and contain of from 2 to 8 condensed polyol units. As examples of suitable ether alcohols may be mentioned diethylene glycol, triethylene glycol, tetraethylene glycol, diethylene glycol, monomethyl ether, diethylene glycol monoethylether, triethylene glycol monomethyl ether, butoxyethanol, butylene glycol monobutyl ether, dipentaerythritol, tripentaerythritol, tetrapentaerythritol, diglycerol, triglycerol, tetraglycerol, pentaglycerol, hexaglycerol, heptaglycerol and octaglycerol. Also suitable compounds have been found to be mono- or diesters of the polyalkylene glycols having 2 to 50 alkylene oxide units, each containing 2 to 4 carbon atoms. Examples thereof include polyethylene oxide glycol having a molecular weight in the range of 500 to 2000 and polytetrahydrofuran having a molecular weight in the range of 600 to 2000. For use in wax compositions not all free hydroxyl groups need be esterified. The scope of the invention also allows the preparation of wax compositions having the above-mentioned favourable properties to be carried out with the use of partially esterified polyols. It is preferred that at least 50% of the suitable hydroxyl groups should be converted into esters. It has been found that wax compositions having exceptionally good lubricating properties are obtained with the use of aliphatic polyols and ether polyols having 2 to 12 carbon atoms and 2 to 8 primary or secondary hydroxyl groups. Special mention should be made of the esters derived from ethylene glycol, neopentyl glycol, trimethylol propane, pentaerythritol, dipentaerythritol, tripentaerythritol, glycerol, and di-, tri- and tetraglycerol. The acid number of these esters is preferably below 30 and the hydroxyl number below 40. The esterification reaction may be carried out in the usual manner. The reaction mixture is heated in the presence or not of a catalyst at a temperature in the range of 100° to 300° C. and the water evolved in the reaction is carried off. The esterification is usually carried out at a temperature in the range of 140° to 280° C. Optionally, use may be made of an esterification catalyst. This may be an acid such as sulphuric acid, phosphoric acid, alkylsulphonic acids and arylsulphonic acids such as p-toluene sulphonic acid and methane sulphonic acid, and a variety of metal compounds such as dibutyl tin oxide, tetrabutyl titanate, zinc acetate, stannooxalate, iron oxide, ferristearate, manganostearate, cobalt (II) stearate and manganoacetate.

The catalyst is usually employed in an amount of 0.1 to 1% by weight, based on the reaction mixture. Optionally, use may be made of an inert thinner which together with water forms an azeotrope, such as benzene, toluene or xylene.

In the process use is generally made of stoichiometric amounts of acid and alcohol, although in the esterification with the more volatile alcohols the latter may be used in excess. By the end of the reaction the excess is removed from the reaction mixture by distillation. Esterification may take place at atmospheric pressure, but it is also possible to have it carried out at reduced pressure (2–50 mm Hg).

Under such conditions the excess alcohol and water can readily be removed upon completion of the reaction. The resulting esters can as a rule directly be incorporated into the wax compositions according to the invention. Under some circumstances, however, it may be advisable also to apply a purification step, for instance by treating the compositions with bleaching earth, ozone, peroxide, hypochlorite or some other suitable bleaching agent. The preparation also may include a treatment with active carbon. It will be obvious that also mixtures of esters derived from at least one acid according to the above first-mentioned formula and more than one alcohol may be suitable to be incorporated into the wax compositions according to the present invention. For the preparation of diesters of acids having the first-mentioned formula it is of advantage to make use of the epoxides instead of the corresponding alcohols. Particularly if instead of the telomeric acids the corresponding anhydrides are used, the reaction in the presence of 1 mole percent of a tetraalkyl ammonium bromide such as tetrabutyl ammonium bromide proceeds very rapidly. It will be evident that in the esterification use may be made of pure telomeric acids or of a mixture thereof with other acids, such as acetic acid, lauric acid or oleic acid. As examples of suitable epoxides for the preparation of diesters may be mentioned ethylene oxide, propylene oxide, the epoxides derived from α-olefins having 3 to 45 carbon atoms, the epoxides derived from other unsaturated alkenes, esters of 2,3-epoxy-1-propanol, epoxidized natural oils, such as epoxidized soy bean oil, cyclic epoxides and di-epoxides. In addition to being suitable for the preparation of diesters the epoxides may be used for the preparation of esters having a high hydroxyl number.

Besides the above-mentioned acids and esters also soaps and mixtures of esters and soaps (ester-soaps) prepared from an acid according to the first-mentioned formula are excellently suitable to be used in the present wax composition.

Useful soaps and ester-soaps prepared from the above-described high molecular weight acids include those obtained using alkali metals, alkaline earth metals, amphoteric metals and heavy metals. Illustrative metals include: lithium, sodium, potassium, beryllium, magnesium, calcium, strontium, barium, copper, silver, zinc, cadmium, mercury, aluminium, titanium, zirconium, tin, lead, antimony, bismuth, chromium, manganese, iron, nickel, cobalt and the like. Especially useful metallic soaps are those prepared from the acids according to the first formula where n represents an integer of from 17 to 42 and the metals of lithium, calcium, barium, magnesium, zinc, lead, cadmium or tin and mixtures thereof.

The salts (soaps) are prepared in a known manner by the dry route of melting. In the preparation of the soaps use will generally be made of the direct procedure of heating the acid in the presence of a metal oxide, hydroxide or weakly acid salt.

Mixtures of esters and soaps are obtained by partial saponification of the acid, that is by reacting the carboxyl groups of the branched-chain acids with a metal compound and an aliphatic hydroxyl compound having 1 to 40, and preferably 2 to 12 carbon atoms and 1 to 10 primary or secondary hydroxyl groups. The reaction of the metal compound and the aliphatic hydroxyl compound with a mixture of the high molecular wieght monocarboxylic acids may be carried out stepwise or in a single step. The monocarboxylic acids may first be contacted with the desired amount of metal compound in order partially to neutralize the acid and subsequently esterifying the remaining carboxyl groups by reaction with the hydroxyl compound. Alternatively, first a part of the carboxyl groups may be esterified and the remaining part of the carboxyl groups be neutralized with the metal compound. It is preferred, however, to apply the single-step procedure.

Esterification is effected under the same conditions as given above for the preparation of the pure esters. Besides salts of metals and tertiary amines such as triethylamine, pyridine and quinoline, the wax compositions according to the invention may contain amides of an aliphatic, cycloaliphatic or aromatic or diamine having 1 or 2 primary or secondary amino groups. Suitable amines from which the amides are derived include: methylamine, ethylene diamine, butylamine, hexamethylene-1,6-diamine, p-phenylene diamine and 1,4-cyclohexyl diamine, methylethyl amine and 2-(N-methylamine) heptane. Also suitable for use are substituted amines, such as ethanol amine and butanol amine. The preparation may be carried out by first converting the acid into the acid chloride by reacting it with, for instance, thionyl chloride or phosphorus trichloride or phosphorus pentachloride, after which the acid chloride is added to the amine in the presence of a base such as an aqueous sodium hydroxide solution or pyridine. The preparation usually takes place by a direct reaction of the amine with the acid, the anhydride or the ester. Another attractive method of preparing the amides of the branched-chain acids according to the first-mentioned formula is characterized by direct reaction of the acid or mixture of acids and the equivalent amount of 1 or more isocyanate groups containing compounds or mixtures thereof. The use of isocyanate groups containing compounds instead of the amoni groups containing compounds has the additional advantage that the reaction proceeds at a higher speed and as by product only the readily isolated carbon dioxide is formed. An important advantage of the novel amide compounds according to the present invention over the known compounds described in the German Pat. No. 2,460,235 inter alia consists in the higher solvent retention. Further they are excellently suitable for increasing the dropping point of paraffin waxes and asphalt and decreasing the viscosity of adhesives. The isocyanates to be used in the preparation of the present compounds may be of an aliphatic or aromatic character. If few or no coloured products are desired, then it is preferred to use aliphatic isocyanates. Preference is further given to isocyanates of the general formula $A-R_1-NCO$, where $R_1$ represents a (cyclo) aliphatic hydrocarbon having at least 6 carbon atoms, a phenyl group or naphthyl group, which groups may be substituted or not with one or more lower alkyl groups having 1 to 8, and preferably 1 to 6 carbon atoms, lower alkoxy groups having 1 to 8, and preferably 1 to 6 carbon atoms, aryl, for instance phenyl, and halogen such as chlorine or bromine, and A represents a —NCO group, or a —$R_2$—($CH_2$—$R_3$—NCO)$_n$ $R_4$ NCO group where $R_2$ has the meaning of a simple bond or an aliphatic hydrocarbon group having 1 to 4 carbon atoms, n is equal to 0 or higher, and $R_3$ and $R_4$ may be the same or different and may or may not have the same meaning as $R_1$.

As examples of suitable monoisocyanates may be mentioned ethyl isocyanate, hexyl isocyanate, 2-ethylhexyl isocyanate, butyl isocyanate, stearyl isocyanate. As examples of diisocyanates which can be defined by the formula OCNRNCO, where R represents a divalent aliphatic, cycloaliphatic or aromatic group, may be mentioned:

hexamethylene diisocyanate;
dimethyl hexamethylene diisocyanate;
trimethyl hexamethylene diisocyanate;
metaxylene diisocyanate;
paraxylene diisocyanate;
tetramethylene diisocyanate.

In the case where R represents an aromatic group, it may be substituted with a halogen, a lower alkyl or a lower alkoxy group.

As examples of such diisocyanates may be mentioned:
1-chloro-2,4-phenylene diisocyanate;
2,4-toluene diisocyanate;
a mixture of 2,4-toluene diisocyanate and 2,6-toluene diisocyanate;
tetramethylphenylene diisocyanate;
diphenylmethane-4,4′-diisocyanate;
metaphenylene diisocyanate;
for instance, paraphenylene diisocyanate;
1,5-naphthaline diisocyanate;
biphenyl-4,4′-diisocyanate;
diphenylmethane-4,4′-diisocyanate;
4,4′isopropylidene diphenylisocyanate;
benzophenone-4′4′-diisocyanate;
diphenylether diisocyanate or diphenylsulphide diisocyanate;
3,3′-dimethyldiphenyl-4,4′-diisocyanate;
3,3′-dimethoxydiphenyl-4,4′-diisocyanate;
3,3′-dichlorodiphenyl-4,4′-diisocyanate;
benzofuran-2,7-diisocyanate.

Examples of diisocyanates having an cycloaliphatic group include isophoron diisocyanate, dycyclohexly methane diisocyanate and 1,4-cyclohexane diisocyanate.

The temperature at which the reaction takes place between the monocarboxylic acid and the isocyanate should be established experimentally. It will generally be in the range of 40 gr to 250 gr.c. The reaction can be followed by the amount of carbon dioxide evolved in the process. The invention is further described in, but not limited by the following examples.

EXAMPLE I

For the preparation of branched-chain acids use was made of a commercially available starting mixture of olefins consisting of about 22% by weight of olefins having not more than 28 carbon atoms and about 78% by weight of olefins having at least 30 carbon atoms (C30″ olefins), about 66% by weight of the olefins being O-olefins the remaining olefin compounds were vinylidene compounds. The reaction was carried out in a stirred (700 r.p.m.) reactor provided with 8 baffles and equipped with a stirrer having 6 diametrically opposed blades. Into this reaction vessel there were charged 12.5 liters (132 moles) of acetic anhydride. The liquid was heated to 120 gr.c. while nitrogen was slowly passed through to remove the oxygen present in it. With the liquid being kept at 120 gr.c. First of all the C30″ olefin mixture was added. Of this mixture in all 1175 g (2.5 moles) were added over a period of 210 minutes after a start had been made with adding olefin a slurry of 0.625 moles Mn (III) acetate in 2.5 l acetic anhydride was added over a period of 216 minutes (so for a period of 18 minutes after the last of the olefin had been added addition of Mn (III) acetate was continued to ensure complete conversion of the olefin).

The mixture was subsequently filtered to remove the Mn (II) acetate that had formed. Next, acetic anhydride and the acetic acid formed were removed by distillation. To the residue there were added 2.5 l acetic acid and 0.3 l water. With vigorous stirring the mixture was boiled with refluxing to hydrolyse the obtained anhydrides. Finally, the water-acetic acid layer was separated off, the product washed 3 times with hot water and dried.

The resulting mixture of straight-chain and branched-chain acids had an acid number of 86 and was esterified under an atmosphere of nitrogen with equivalent amounts of suitable alcohols.

In the esterification with pentaerythritol the following procedure was used.

To 300 grammes of the above-described mixture of melted acids there were added 16.4 grammes of pentaerythritol (1.05 equivalents) and 0.6 grammes of zinc acetate. The mixture was stirred at 190° C. and the water evolved was carried off by a nitrogen stream. After 5 hours the remaining water and alcohol were removed under reduced pressure (14 mm Hg). The drop point of the resulting tetraester was 86. The acid number was 10.3; the hydroxyl number was between 2 and 5. A similar procedure was used for the preparation of ethylene glycol ester and 1,3-butanediol ester. The 1–3,-butanediol ester was mixed with 40% by weight calcium soap.

On the resulting products the following properties were measured:

1. Ubbelohde dropping point °C. (heating rate 1° C./min.), which is a measure of the "melting point" of the wax composition. The dropping point was determined with a Mettler FP53 tester.
2. Ubbelohde dropping point °C. (heating rate 1° C./min.) as under 1, but after mixing 1 part of wax with 4 parts of paraffin.
3. Penetration of paraffin mixture, in accordance with ASTM D 1321-70. In this way an indication of the hardness increasing effect of the esters is obtained.
4. Continental solid point, in accordance with ASTM D 938-49. This point corresponds to the congealing point of 1 part of wax, 4 parts of paraffin and 15 parts of turpentine.
5. Consistency of paste, as described in "Vom Wachs, Hoechster Beitrage Zur Kenntnis Der Wachse", Farbw. Hoechst, Frankfurt-Hoechst, Vol. II, Beitrag II, P. 50–51, in that test a stamp of some particular weight and dimensions is slowly, while subjected to a gradually increasing pressure, brought into contact with the paste.
6. Solvent retention, to determine this property 1 part of the wax to be examined was mixed with 4 parts of paraffin and 15 parts of turpentine and the resulting mixture was brought into a tim. After the closed tin had been left for 17 hours at 23° C., it was placed in a ventilated oven. After it had been in the oven for 7 days at 32° C. and subsequently on a table for another 7 days at 20° C., the solvent retention was measured. It is expressed as follows:

Solvent retention:

$$\frac{\text{Amount of turpentine lost}}{\text{original amount of turpentine}} \times 100\%$$

The results are listed in the following table and compared with those of the known wax compositions.

EXAMPLE II

In the same way as described in the preceding Example the following compounds according to the invention were tested for their being suitable partially or entirely to replace the known carnauba and/or montanic acid waxes.

| Wax | dropping point | dropping[a] point of paraffin mixture (°C.) | penetration[a] of paraffin mixture (0,1 mm) |
|---|---|---|---|
| paraffin | 60 | (60) | 17 |
| carnauba prime yellow[b] | 85 | 81 | 7 |
| montanic acids | 86 | 79 | 5 |
| montanic acid ethylene glycol ester | 83 | 77 | 7 |
| montanic acid 1,3-butanediol ester-40% calcium soap | 102 | 90 | 5 |
| $C_{30+}$ acids or the derived | 92 | 77 | 7,5 |
| ethylene glycol ester 1,3-butanediol ester-40% calcium soap ⎬[d] | 93 | 78 | 7 |
|  | 106 | 83 | 6 |
| pentaerythritol ester | 86 | 72 | 5 | a. Paraffin mixture: 1 part of wax + 4 parts of paraffin
b. Carnauba wax, which is a natural wax, containing 80% of esters of acids-long-chain ($\geq C24$) and substituted or unsubstituted cinnamic acid- and long-chain ($\geq C30$) alcohols.

| Wax | paste consistency (g/cm$^2$) | continental[c] solid point (°C.) | solvent retention (%) |
|---|---|---|---|
| Carnauba fatty gray | 1500 | 40 | 31 |
| montanic acids | 1200 | 40 | 20 |
| montanic acid ethylene glycol ester | 1100 | — | — |
| montanic acid 1,3-butanediol ester-40% calcium soap | 1350 | 40 | 51 |
| $C_{30+}$ acids or the derived | 1540 | 44 | 79 |
| ethylene glycol ester 1,3 butanediol ester-20% calcium soap ⎬[d] | 1150 | 39 | 75 |
|  | 1300 | 40 | 73 |
| pentaerythritol ester | 800 | 42 | 63 |
| pentaerythritol ester-40% calcium soap | 1350 | 41 | 37 | c. Paste composition: 1 part of wax, 4 parts of paraffin; 15 parts of turpentine.
d. Derived from straight-chain and branched-chain acids according to the invention.

| WAX | DROPPING POINT (°C.) | DROPPING POINT OF PARAFFIN MIXTURE (°C.) | PENETRATION OF PARAFFIN MIXTURE (0.1 mm) |
|---|---|---|---|
| ester of C acid and stearyl alcohol | 83 | 72 | 9.0 |
| ester of C30″ acid and the C30″ alcohol obtained from it by reduction | 94 | 80 | 7.5 |
| ester of C30″ acid and polyethylene glycol (mol wt 600) | 86 | 72 | 13.0 |
| ester of C30″ acid and polyethylene glycol (mol wt 1000) | 86 | 73 | 13.0 |
| diester of C22-26″ acid and 4,4-isopropylidend diphenoxyethanol | 53 | 59 | 11.5 |
| diamide of C22-26″ acid and 2,4-toluene-diisocyanate | 111 | 92 | 8.0 |
| paraffin | 60 | (60) | 17.0 |

| wax | continental solid point (°C.) | paste consistency (g/cm$^2$) | solvent retention (%) |
|---|---|---|---|
| ester of $C_{30+}$ acid and stearyl alcohol | 38 | 860 | 73 |
| ester of $C_{30+}$ acid and $C_{30+}$ alcohol | 45 | 950 | 63 |
| ester of $C_{30+}$ acid and polyethylene glycol (mol. wt 600) | 43 | 1400 | 96 |
| ester of $C_{30+}$ acid and polyethylene glycol (mol. wt 1000) | 39 | 1100 | 96 |

EXAMPLE III

In this example it is demonstrated that the mixture of pentaerythritol esters prepared according to the procedure used in Example I can very well be emulsified. As emulgator was used the combination oleic acid-amine. Examples of suitable amines include morpholine or 2-amino-2-methylpropanol. The emulsion was prepared by adding 5 grammes of morpholine to a melted mixture made up of 30 g of wax and 6 g of oleic acid at a temperature of 98° C. and the mixture was stirred for ¾ minutes. Subsequently, 20 g of boiling water were added over a period of ¾ minutes while increasing the stirring speed to 2000 revolutions per minute, which speed was maintained for 3 more minutes. Next, 180 g of boiling water were added over a period of 2 minutes, after which the mixture was rapidly cooled with an external ice bath and diluted with 60 g of cold water. The resulting emulsion was extraordinarily stable; the particle size was in the order of 0.5 μm.

Adding a polystyrene emulsion resulted in obtaining an excellent floor polish. The gloss obtained after drying bore comparison with that obtained after the use of a similar emulsion containing carbauba-prime-yellow as wax component to which no polystyrene emulsion had been added.

EXAMPLE IV

In the same way as indicated in Example I for the esterification of a mixture of C30″ acids, 12.7 g of hexamethylene diamine (1.05 equivalents) were added to 300 g of melted acids, the mixture was stirred at 240° C. and the water evolved was carried off by a stream of nitrogen. After 5 hours the remaining volatile constituents were removed under reduced pressure (14 mm hg). The acid number of the resulting reaction product was 4.2. In a similar way the amides were prepared from 4,4'-diamino-diphenylmethane and benzidine. The products were very hard. As is shown in the following table.

| WAX | ACID NUMBER | UBBEL-OHDE DROPPING POINT (°C.) | UBBEL-OHDE (A) DROPPING POINT (°C.) | PENETRATION (B) OF PARAFFIN MIXTURE (0.1 mm) |
|---|---|---|---|---|
| Paraffin | — | 60 | (60) | 17 |
| Amide of hexamethylene diamine | 4.2 | 124 | 110 | 8 |
| Amide of diamino-diphenyl methane | 9.8 | 128 | 100 | 6 |
| amide of benzidine | 10.4 | 165 | 103 | 6C |

(A) Paraffin mixture: 1 part of wax, 4 parts paraffin
(B) In accordance with ASTM D 1321-70
(C) Unreliable because of brittleness of sample.

EXAMPLE V

Using the same procedure as in Example I, 200 g of C30″ acids (acid number 86.4) were esterified with 57 g of polypropylene glycol (average molecular weight 400) in the presence of 0.4 g of zinc acetate as catalyst. The esterification lasted 7 hours at 185° C. and was carried out while passing through a stream of nitrogen. The resulting product had a dropping point of 73° C. and should be emulsified to a milk white emulsion.

EXAMPLE VI

In a similar way as used in the preceding example 200 g of $C_{30+}$ acid were esterified with 92 g of polyethylene glycol (average molecular weight 600) in the presence of 0.4 g of zinc acetate. The resulting product was a hard ester wax having a dropping point of 89° C. It could readily be emulsified to a translucent wax emulsion.

We claim:

1. A wax composition for entirely or partly replacing carnauba wax or montan wax and substantially consisting of one or more acids and/or derivatives thereof selected from the group consisting of
   A. ester of phenols or aromatic, aliphatic or cycloaliphatic alcohols having at least 1 to 10 primary or secondary hydroxyl groups;
   B. amides of aliphatic, cycloaliphatic or aromatic mono- or diamines having 1 or 2 primary or secondary amino groups;
   C. salts of alkali metals or alkaline earth metals, emphoeric metals, heavy metals, of ammonium or of a compound containing a tertiary amino group;

characterized in that at least 40% by weight of the acid present as such, or at least 40% by weight of the acid from which the derivatives are prepared has a branched-chain structure and at least 10% by weight thereof corresponds to the formula:

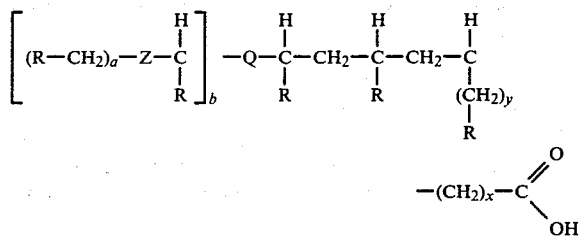

where
   $x=0$, if $y=2$
   or $x=2$, if $y=0$
   $R=CH_3(CH_2)_n$, where n represents an integer from 17 to 42; b is 0 or 1, where, if $b=0$, Q represents a hydrogen atom, and if $b=1$, Q represents a $CH_2$-group, and
   $a=0$ or 1, where if $a=0$, Z represents a hydrogen atom, and if $a=1$, Z represents a $CH_2$-group.

2. A wax composition according to claim 1 characterized in that a portion of the branched-chain acids, or a portion of the branched-acids from which the derivatives are prepared corresponds to the formula:

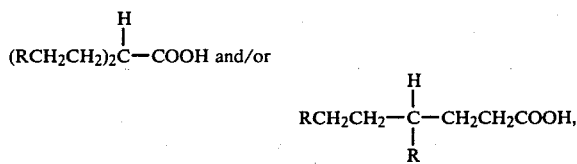

where R has the meaning given in claim 1.

3. A wax composition according to the claims 1 or 2, characterized in that besides the branched-chain acids or derivatives thereof having the formulae given for these acids in claims 1 or 2 there is present an amount of 40 to 60 percent by weight of linear aliphatic monocarboxylic acids or derivatives thereof, with the acid having the formula $RCH_2CH_2CH_2COOH$, where R has the meaning given in claim 1 and about 30 to 40 percent by weight of γ-branched carboxylic acids or derivatives thereof, with the acid having the formula:

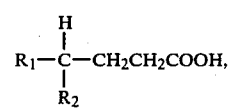

where $R_1$ and $R_2$ represent linear alkyl groups which together have the same number of carbon atoms as the group R.

* * * * *